(12) United States Patent
Banal et al.

(10) Patent No.: US 6,729,870 B2
(45) Date of Patent: May 4, 2004

(54) MULTI-CAVITY OPTICAL DISC MOLD

(75) Inventors: Anthony O. Banal, Fergus Falls, MN (US); Dean E. Sitz, Wahpeton, ND (US)

(73) Assignee: Imation Corp., Oakdale, MN (US)

( * ) Notice: Subject to any disclaimer, the term of this patent is extended or adjusted under 35 U.S.C. 154(b) by 121 days.

(21) Appl. No.: 10/013,101

(22) Filed: Nov. 6, 2001

(65) Prior Publication Data

US 2003/0086998 A1 May 8, 2003

(51) Int. Cl.⁷ .............................................. B29D 11/00
(52) U.S. Cl. .................... 425/552; 425/556; 425/588; 425/810
(58) Field of Search ................................ 425/552, 556, 425/588, 444, 810; 264/328.8

(56) References Cited

U.S. PATENT DOCUMENTS

| | | | | |
|---|---|---|---|---|
| 4,891,001 A | * | 1/1990 | Gellert | 425/549 |
| 5,232,710 A | * | 8/1993 | Miyazawa et al. | 425/130 |
| 5,238,393 A | | 8/1993 | Kishi | |
| 5,356,283 A | * | 10/1994 | Hamada et al. | 425/544 |
| 5,388,982 A | * | 2/1995 | Takahashi et al. | 425/572 |
| 5,648,105 A | | 7/1997 | Shimazu et al. | |
| 5,914,136 A | * | 6/1999 | Han | 425/117 |
| 6,036,472 A | * | 3/2000 | Boudreau et al. | 425/556 |
| 6,264,459 B1 | | 7/2001 | Voets | |
| 6,368,542 B1 | * | 4/2002 | Steil et al. | 264/328.14 |

* cited by examiner

Primary Examiner—James P. Mackey
Assistant Examiner—Donald Heckenberg
(74) Attorney, Agent, or Firm—Eric D. Levinson

(57) ABSTRACT

A multiple cavity injection molding system having at least two single cavity injection molds for forming optical discs. The single cavity injection molds are physically and thermally separated from each other. Each single cavity injection mold has first and second mating portions which are movable between a closed position in which a mold cavity is formed and an open position in which the object is removed from the mold cavity. A resin delivery system is operatively coupled to the first mating portion of each of the single cavity injection molds for delivering resin into each of the two single cavity injection molds, and an ejector system is operatively coupled to the second mating portion of the single cavity injection mold for ejecting the molded disc from the mold cavity.

20 Claims, 1 Drawing Sheet

MULTI-CAVITY OPTICAL DISC MOLD

THE FIELD OF THE INVENTION

The present invention generally relates to a multi-cavity injection molding apparatus for optical disc substrates such as compact discs, and more particularly to a multi-cavity injection molding apparatus which uses a plurality of single cavity molds.

BACKGROUND OF THE INVENTION

The molding of optical discs, such as CDs, CD RWs, DVDs and miniature optical formats, is generally known. Typically, an optical disc substrate is molded from a polymer resin using an injection molding apparatus. Data is stored on the optical disc by the creation of dark and bright spots (such as by the creation of pits, the use of photosensitive dyes, or the use of phase change media). The dark and bright spots may be formed during the manufacturing process or later during an optical write process, such as in a CD RW disc.

Because recorded information is read by utilizing optical characteristics of the disc, it is important that the disc is uniform in both optical characteristics and physical dimensions. Variations in the disc may induce errors in the writing of information to the disc, or in the reading of information from the disc. Variations may be caused by non-uniform resin properties, variations in dimensions of the disc, warping of the disc, etc.

The ability to minimize or eliminate such variations of the disc becomes increasingly important as the volume of information stored on the discs increases, and as the speed of the discs increases. For example, the track density of a DVD may be in excess of two to three times the track density of an audio CD. Thus, a flaw in the disc which may not affect the reading or writing of information to the disc at low densities or slow disc speeds may cause significant problems at higher track densities and disc speeds. Accordingly, discs which store information at high densities and are used in high speed disc drives are more susceptible to errors in the disc optical properties or dimensions, and it is increasingly important to maintain the optical disc within acceptable tolerances.

Because of the tight tolerances required for high density optical discs, such discs are typically made in an injection molding process which utilizes a single cavity mold. Single cavity molds are used because they provide a more uniform and consistent flow of resin into the mold cavity and more uniform thermal characteristics for the cooling of the molded disc. Non-uniform thermal characteristics of the mold (such as uneven temperatures across the mold, differing heat transfer rates, etc.) may lead to non-uniform curing of the resin, which in turn may alter the optical characteristics of the disc or cause warping of the disc as it cools. As noted above, such variations in the disc are unacceptable for high density information storage.

Although single cavity molds typically provide the best uniformity in the optical discs, they have the deficiency of rather inefficient productivity. That is, only a single optical disc may be formed at one time. The molding of each disc is necessarily separated by the steps of opening the mold, ejecting the molded object, closing the mold, and repeating the process. Clearly, multicavity molding would provide greater efficiency because multiple discs could be molded in a single step. The multicavity molding of optical discs is known, such as described in U.S. Pat. No. 5,648,105.

Although multicavity molding of optical discs has the advantage of more efficient production, it also has several disadvantages. In particular, multicavity molds suffer the disadvantage of non-uniform thermal characteristics surrounding the individual cavities of the multicavity mold. Thus, cavities (or portions of cavities) of the multicavity mold which are adjacent the edge of the mold may stay cooler or experience faster cooling than those cavities (or portions of cavities) which are closer to the center of the multicavity mold. As noted above, non-uniform thermal characteristics of the mold lead to variations in the optical and dimensional properties of the discs which render them unsuitable for use in high density storage applications.

Multicavity molds have other disadvantages as well. Because of the large number of features which must be created in each mold plate, they are difficult (and hence expensive) to manufacture. The large number of features in each mold plate also makes troubleshooting of the system problematic, as it is difficult to isolate a particular feature as the cause of a molding problem. The alignment between the halves of the molds must be precise such that the individual cavities of the mold properly align when the mold is in a closed position, and different rates of thermal expansion across the multicavity mold may cause misalignment of the individual mold cavities, leading to unusable discs. Also, many manufacturers of high density optical discs currently use single cavity molds for the reasons described above. It would be prohibitively expensive to replace those single cavity molds with multicavity molds.

Clearly, it would be desirable to provide an apparatus and method which combines the high quality production of single cavity molds with the high-capacity production of multicavity molds, while not requiring manufacturers to replace their current stock of single cavity molds.

SUMMARY OF THE INVENTION

The present invention is a multiple cavity injection molding system which utilizes at least two single cavity injection molds for forming optical discs. Each single cavity injection mold has first and second mating portions which are movable between a closed position in which a mold cavity is formed and an open position in which the disc is removed from the mold cavity. A resin delivery system is operatively coupled to the first mating portion of each of the at least two single cavity injection molds for delivering resin into each of the mold cavities. An ejector system is operatively coupled to the second mating portion of the injection molds for ejecting the molded disc from the mold cavity. The present invention allows existing single cavity molds to be used in a multicavity system.

In a preferred embodiment, the single cavity injection molds are physically and thermally separated from each other, so as to maintain uniform thermal characteristics across each mold cavity. The thermal isolation may be created by providing an air gap between the single cavity molds. In other embodiments, a coolant may be circulated between the single cavity molds to maintain thermal uniformity. The preferred physical and thermal separation of the single cavity molds allows the mating portions of the molds to independently center themselves upon being moved to the closed position, thereby eliminating the effects of thermally induced dimensional changes.

DESCRIPTION OF THE PREFERRED EMBODIMENTS

Figure 1:
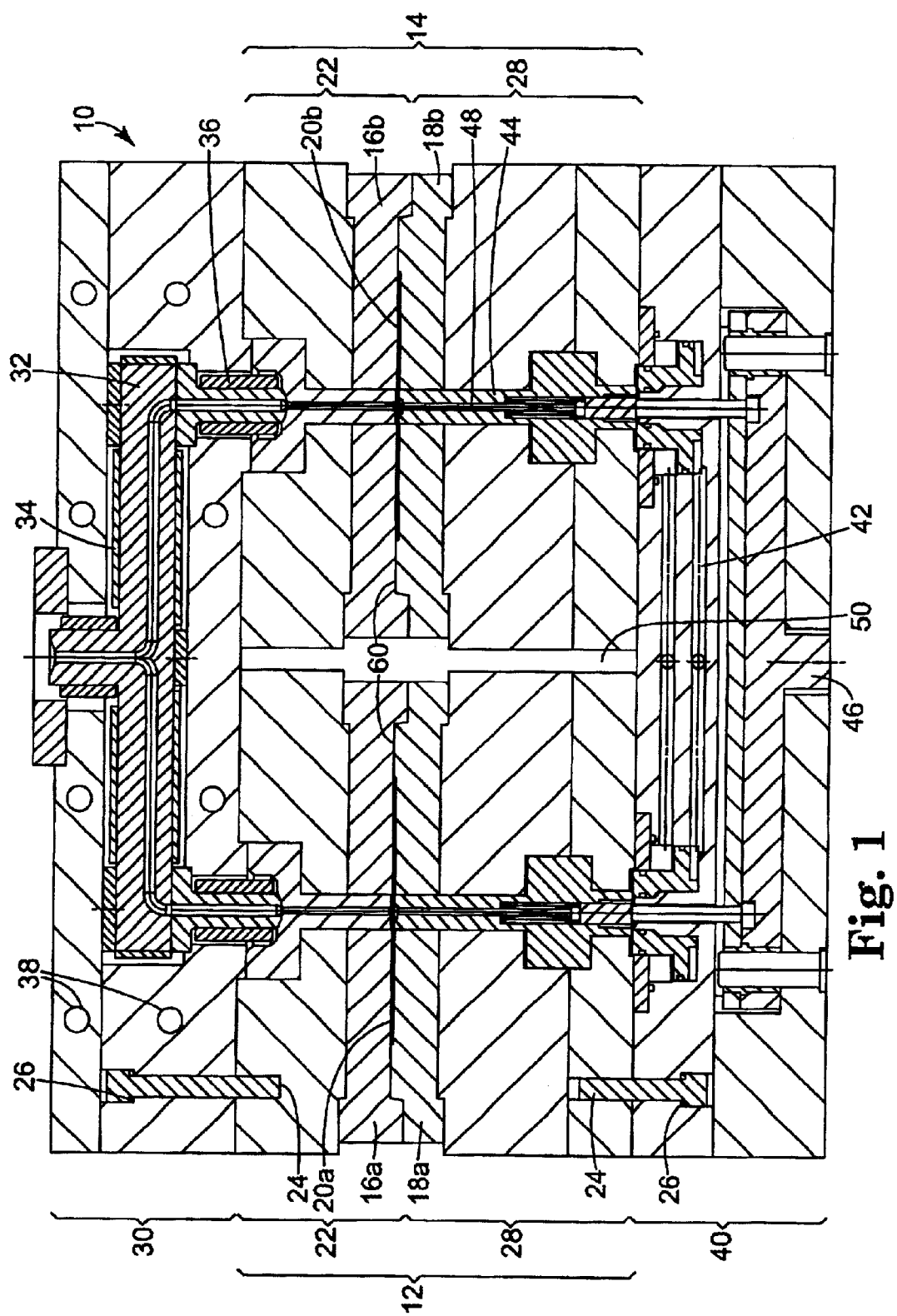
FIG. 1 is a cross-sectional view of the multicavity injection molding system of the present invention.

In the following detailed description of the preferred embodiments, reference is made to the accompanying drawing which forms a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention, shown in FIG. 1, is a multiple cavity injection molding system 10 which utilizes multiple separate and isolated single cavity injection molds 12, 14 for forming objects, specifically optical discs. By way of example only, the multiple cavity injection molding system 10 shown in FIG. 1 uses two single cavity molds 12, 14, although any number of individual single cavity molds could theoretically be used. The single cavity molds 12, 14 have first mating portions 16a, 16b and second mating portions 18a, 18b, respectively, which are movable between a closed position (as shown in FIG. 1) in which mold cavities 20a, 20b are formed and an open position (not shown) in which the object is removed from the mold.

The cavity side portions 22 (sometimes known as the fixed side of the mold) of single cavity injection molds 12, 14 are operatively coupled to a resin delivery system 30 which delivers molten resin (typically a polycarbonate or acrylic material) into each of the mold cavities 20a, 20b. Preferably, cavity side portions 22 are secured to resin delivery system 30 by bolts 24 which utilize Belleville washers 26 (sometimes referred to as "spring washers"). The use of Belleville washers 26 permits cavity side portions 22 some range of motion, so that first mating portions 16a, 16b may align correctly with second mating portions 18a, 18b.

To maintain and increase the uniformity of the molded optical disc, it is preferred that the resin delivery system delivers resin into each of the single cavity injection molds 12, 14 in a manner duplicative of the resin delivery system used when the mold is used in a single cavity system. The specific construction of the resin delivery system 30 will thus depend upon the system in which the single cavity molds 12, 14 were originally intended to be used.

Resin delivery system 30 includes a hot runner manifold 32, which is preferably provided with thermal insulation 34 to contain the heat of the system. In a preferred embodiment, the hot runner manifold 32 contains one "shot" or less of resin (where a "shot" of resin is the amount of resin required to fill the mold cavities 20a, 20b) to reduce or eliminate resin degradation issues due to the residence time of the resin in the hot runner manifold 32. The hot runner manifold 32 has, in the preferred embodiment, a heated probe 36 to aid in maintaining the temperature of the resin as it exits the hot runner manifold 32. However, to minimize thermal discontinuities within the molds 12, 14, it is preferred that the hot runner manifold 32 of the resin delivery system 30 does not extend to the parting line 60 of the individual molds 12, 14. The resin delivery system 30 may further include cooling lines 38 for circulation of a coolant to assist in maintaining proper temperature of the injection molds 12, 14.

The core side portions 28 (sometimes known as the moving side of the mold of single cavity injection molds 12, 14 are operatively coupled to an ejector system 40 for ejecting the molded object from the mold cavities 20a, 20b when the molds have been moved to an open position. Similar to cavity side portions 22, core side portions 28 of single cavity injection molds 12, 14 are secured to ejector system 40 by bolts 24 and Belleville washers 26. As noted above with respect to cavity side portions 22, the use of Belleville washers allows core side portions 28 some degree of movement, thereby ensuring that mating portions 16a, 16b and 18a, 18b align correctly each time molds 12, 14 are moved to a closed position.

Ejector system 40 is similar to other ejector systems known in the art. As with resin delivery system 30, ejector system 40 will be constructed to operate in a manner duplicative of the ejection system used when the molds 12, 14 are using a single cavity system.

In general, ejector system 40 includes a hydraulic or pneumatic circuit 42 to activate cut punches 44 in injection molds 12, 14. When activated, cut punches 44 advance to cut the center holes for the optical discs. Preferably, cut punches 44 do not completely perforate the molded disc, and instead leave a thin layer of material holding the center and attached sprue in place. The sprue and center piece may be easily snapped free after the disc is removed from the mold.

Ejector system 40 also includes means 46 for activating ejector pins 48 within injection molds 12, 14 to remove the molded optical disc from the mold cavities 20a, 20b when the injection molds 12, 14 are moved to an open position. As is known in the art, a robotic picker may be used to secure the molded disc and remove it from the mold.

As can be seen from examining FIG. 1, the single cavity injection molds 12, 14 are separated from each other by a gap 50 which acts as an insulator between the single cavity molds 12, 14. In one embodiment, gap 50 is filled with ambient air. However, other materials having low thermal conductivity (such as a ceramic material) could be used to separate and insulate the individual single cavity molds 12, 14. It is important to thermally isolate, as much as possible, the individual single cavity molds 12, 14 from each other. By thermally isolating the single cavity molds 12, 14 from each other, more uniform thermal characteristics may be obtained within each individual mold cavity 20a, 20b, as well as from mold cavity to mold cavity. As noted above, by keeping the thermal characteristics of the molds 12, 14 uniform, the optical characteristics of the molded discs may be kept within the tolerances necessary for high density information storage on the optical discs.

The thermal uniformity of the single cavity molds 12, 14 may also be maintained by, for example, circulating a coolant (not shown) between the individual injection molds. The coolant may be a gas such as air, or a liquid such as water or other appropriate coolant medium.

Because the individual single cavity injection molds 12, 14 are separated from each other, and the cavity sides 22 and core sides 28 are secured using the Belleville washer system described above, the first and second mating portions 16a, 16b and 18a, 18b, respectively, can independently center themselves upon moving to the closed position. Thus, any thermally induced dimensional changes in either the resin delivery system 30 or the ejector system 40 may be accommodated without causing misalignment between the first and second mating portions 16a, 16b and 18a, 18b, respectively, of the injection molds 12, 14 themselves. This offers a significant advantage over currently available multiple cavity molds, which are unable to accommodate such thermally induced dimensional changes.

The multicavity injection molding system 10 described herein provides several benefits and advantages. First, the multicavity injection molding system 10 maintains the high-quality production standards of single cavity molds which are necessary for high density information storage on optical discs. In addition, it provides the high-capacity production of multicavity molds, without the attendant disadvantages of multicavity molds. Specifically, the single cavity molds 12, 14 may be individually checked for proper operation prior to use in the multicavity injection molding system described herein. This makes later troubleshooting much easier, in that molding problems are most likely in either resin delivery system 30 or ejector system 40. Finally, the invention provides a significant economic advantage in that currently in-use single cavity molds may be used in either single cavity systems or in the above described invention, and the manufacture of new injection molds is not required.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the art will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A multiple cavity injection molding system comprising:
   at least two single cavity injection molds for forming objects, each single cavity injection mold having a first mating portion and a second mating portion which are movable between a closed position in which a mold cavity is formed by the first and second mating portions and an open position in which the object is removed from the mold cavity, wherein the first mating portions and second mating portions of each single cavity injection mold are all capable of moving independently from each other;
   a resin delivery system operatively coupled to the first mating portion of each of the at least two single cavity injection molds for delivering resin into each of the at least two single cavity injection molds; and
   an ejector system operatively coupled to the second mating portion of the at least two single cavity injection molds for ejecting the object from the mold cavity.

2. The multiple cavity injection molding system of claim 1, wherein the at least two single cavity injection molds are optical disc molds.

3. The multiple cavity injection molding system of claim 1, wherein the injection molds are separated from each other by a material having low thermal conductivity.

4. The multiple cavity injection molding system of claim 3, wherein the material having low thermal conductivity is air.

5. The multiple cavity injection molding system of claim 3, wherein the material having low thermal conductivity is a ceramic.

6. The multiple cavity injection molding system of claim 1, wherein a coolant is circulated between the injection mold.

7. The multiple cavity injection molding system of claim 6, wherein the coolant is a gas.

8. The multiple cavity injection molding system of claim 7, wherein the gas is air.

9. The multiple cavity injection molding system of claim 6, wherein the coolant is a liquid.

10. The multiple cavity injection molding system of claim 1, wherein the mating portions of each of the at least two injection molds independently center themselves upon moving to the closed position.

11. The multiple cavity injection molding system of claim 1, wherein the resin delivery system delivers resin into each of the at least two injection molds in a manner duplicative of a single cavity injection mold resin delivery system.

12. The multiple cavity injection molding system of claim 1, wherein this resin delivery system includes a hot runner manifold, and wherein the termination of the hot runner manifold is spaced from a parting line of the injection molds.

13. The multiple cavity injection molding system of claim 1, wherein the first mating portion of each single cavity injection mold is resiliently coupled to the resin delivery system.

14. The multiple cavity injection molding system of claim 13, wherein Belleville washers are used to resiliently couple the first mating portion to the resin delivery system.

15. The multiple cavity injection molding system of claim 1, wherein the second mating portion of each single cavity injection mold is resiliently coupled to the ejector system.

16. The multiple cavity injection molding system of claim 15, wherein Belleville washers are used to resiliently couple the second mating portion to the ejector system.

17. A multiple cavity injection molding system comprising:
   a resin injection mechanism;
   an ejector mechanism;
   a first mold for forming an optical disc, a cavity side of the first mold movably coupled to the resin injection mechanism and a mating core side of the first mold resiliently coupled to the ejector mechanism;
   a second mold for forming an optical disc, a cavity side of the second mold movably coupled to the resin injection mechanism and a mating core side of the second mold resiliently coupled to the ejector mechanism; and
   wherein the cavity sides and core sides of the first and second molds are all capable of moving independently from each other.

18. The multiple cavity injection molding system of claim 17, wherein the first mold and the second mold are separated by an insulative material.

19. The multiple cavity injection molding system of claim 18, wherein the insulative material is air.

20. The multiple cavity injection molding system of claim 17, wherein the first mold and the second mold are single cavity molds.

* * * * *